United States Patent [19]

Holmes et al.

[11] Patent Number: 5,247,683
[45] Date of Patent: Sep. 21, 1993

[54] SYSTEM AND METHOD FOR INSTALLING SOFTWARE AND UPDATING CONFIGURATION FILES

[75] Inventors: Keith Holmes; Connel G. Cunningham; Fiona Gleeson, all of Dublin, Ireland

[73] Assignee: International Business Machines Corporation, Armonk, N.Y.

[21] Appl. No.: 717,449

[22] Filed: Jun. 19, 1991

[30] Foreign Application Priority Data

Jun. 28, 1990 [EP] European Pat. Off. ........ 90307115.7

[51] Int. Cl.[5] .......................... G06F 7/14; G06F 7/06
[52] U.S. Cl. ..................................... 395/700; 395/600;
364/949.4; 364/946.7; 364/DIG. 2
[58] Field of Search ........................ 395/600, 500, 700

[56] References Cited

U.S. PATENT DOCUMENTS

| | | | |
|---|---|---|---|
| 4,558,413 | 12/1985 | Schmidt et al. | 364/300 |
| 4,646,229 | 2/1987 | Boyle | 395/600 |
| 4,792,896 | 12/1988 | Maclean et al. | 364/200 |
| 4,809,170 | 2/1989 | Leblang et al. | 364/200 |
| 4,912,637 | 3/1990 | Sheedy et al. | 395/600 |
| 4,982,324 | 1/1991 | McConaughy et al. | 364/200 |
| 5,019,963 | 5/1991 | Alderson et al. | 364/200 |
| 5,109,484 | 4/1992 | Hughes et al. | 395/200 |
| 5,146,559 | 9/1992 | Orimo et al. | 395/200 |
| 5,155,847 | 10/1992 | Kirouac et al. | 395/600 |

Primary Examiner—Thomas C. Lee
Assistant Examiner—Peter Y. Wang
Attorney, Agent, or Firm—Wayne P. Bailey

[57] ABSTRACT

A process of software installation over a data processing network is described. New pieces of software being installed over a data processing network require changes to the configuration of the workstation upon which they are being installed. The configuration file associated with the use of the new software being installed specifies the changes to the configuration of the workstation upon which the new software is being installed. This configuration build file is combined with configuration build files associated with the software files already upon the workstation to produce the composite build file. The composite build file is then used to reconfigure the workstation. The process allows for clashes between changes required by each piece of software to be resolved on a priority basis. Configuration change statements within each of the configuration build files can be combined into single configuration change statements. Configuration change statements can specify parameters in terms of a variable, the value of which is determined during the combination process.

27 Claims, 2 Drawing Sheets

| SOFTWARE 1 | SOFTWARE 2 | SOFTWARE 3 |
|---|---|---|
| IOPL = YES (100)<br>DEVICE = <DRIVE>:AA.SYS<br>BUFFERS = 60<br>PATH = C:\OS2 | IOPL = NO (50)<br>DEVICE = C : BB. SYS<br>BUFFERS = 20<br>PATH = C:\FRED | IOPL = NO (40)<br>DEVICE = C : CC. SYS<br><br>PATH = C:\JOE |
| ↑ 22 | ↑ 24 | ↑ 26 |

IOPL = YES
DEVICE = A : AA. SYS
DEVICE = C : BB. SYS
DEVICE = C : CC. SYS
BUFFERS = 60
PATH = C:\OS2; C:\FRED; C:\JOE

↑ 28

SYSTEM AND METHOD FOR INSTALLING SOFTWARE AND UPDATING CONFIGURATION FILES

FIELD OF THE INVENTION

This invention relates to data processing systems. More particularly, this invention relates to the installation of software on data processing systems.

BACKGROUND ART

A given data processing system may be configured in many ways. Some of the configuration options are set by varying the hardware (e.g. number and capacity of disk drives). Other configuration parameters are set within configuration files stored by the computer. An example of such a configuration file stored within a data processing system is the CONFIG.SYS file within personal computers such as the IBM Personal System/2 computers running under the Operating System/2 program (IBM, Personal System/2, and Operating System/2 are trade marks of International Business Machines Corporation). An example of the parameters set by such configurations files is the COUNTRY statement indicating the appropriate national character set to be displayed by the computer or DEVICE statements indicating which device driver code is to be used for the peripherals attached to the computer.

As well as the configuration parameters relating to the computer itself, the configuration files also contain parameters determined by the software installed upon the computer. An example of such a parameter would be PATH statements which indicate in which file directories the computer should search for files requested from the operating system command line. Particular pieces of software may also require a particular buffer size to run effectively, and this can be set by the BUFFER statement.

It is desirable that computer systems should be able to be used by persons not having a detailed understanding of all the configuration options of a computer and the knowledge of how to change them. Accordingly, it is known for computer programs automatically to add statements to the configuration files when they are installed. This has the result that a novice user can merely insert a diskette holding a copy of the program he wishes to install and type a single command such as INSTALL. This start a program running which will copy the program form the diskette into the storage of the computer and make all the necessary changes to the configuration file.

In order to further simplify the installation of computer programs systems have been produced which distribute software over a data processing network. New software files, or updates to files already held by a workstation may be transmitted to the workstation over communication lines without the workstation user having to be involved in handling diskettes or initiating the installation.

It is a constant aim in the field of data processing to produce systems that are easier to use. The invention is concerned with this problem.

SUMMARY OF THE INVENTION

Viewed from one aspect the invention provides a method of installing software files within a data processing network comprising the steps of transmitting a software file from a central computer to a workstation via a communication system, reading a configuration build file associated with said transmitted software file, detecting software files already installed upon said workstation, reading one or more configuration build files associated with said detected software files, combining said configuration build file associated with said transmitted software file with said one or more configuration build files associated with said detected software files to produce a composite configuration build file, and reconfiguring said workstation using said composite configuration build file.

The present invention both recognizes and solves the problem that when using a program that installs software files over a network, it is necessary to coordinate the changes to the configuration of the workstations being made to accommodate the software files installed. The building of a composite configuration build file which is used to reconfigure the workstation also has the advantage of providing an opportunity, if desired, to allow further processing steps to be implemented for providing new functions in the building of configuration files.

It will be appreciated that each software file installed need not necessarily require a modification to the configuration of the workstation, and that the configuration build files associated with the detected software may be stored as separate files or as a single file for those items of software already installed. It will also be appreciated that the software files being installed need not necessarily be a program file, a data file being installed may also require changes to the workstation configuration. The processing to carry out the reading, detecting and combining may be carried out on either the workstation or the computer providing the software file. The configuration build files may comprise instructions capable of being directly applied to alter the workstation configuration, but preferably they comprise instructions intended for further processing to then produce the command to be applied to the workstation (this allows greater flexibility).

In preferred embodiments of the invention, configuration changes required by a software file are associated with a priority value and said step of combining compares priority values between any conflicting configuration changes and includes the highest priority configuration change in said composite configuration build file. This feature allows for conflicts between the requirements of different software files to be resolved in an ordered fashion. An example of such a conflict would be between (YES, NO) settings of the IOPL parameter in the Operating System/2 program. The IOPL parameter specifies the input/output privilege level of applications running within the workstation. One program may not need access to the deepest layer of I/O function in operating system of the workstation by setting IOPL-=NO. whereas another program may be critically dependent upon this I/O access, in which case IOPL-=YES is set. A numerical priority value associated with each configuration build file can resolve the conflict and adopt the setting that is most critical. It will be appreciated that not every configuration change will give rise to conflicts, e.g. setting up device drivers using the DEVICE command need not cause conflict and accordingly need not have a priority value associated with it.

Another feature of preferred embodiments of the invention is the further step of determining values of variables specifying configuration changes within said configuration build files. This feature allows a configuration to be specified in terms of a variable, the value of which may be determined immediately before the configuration change is made. An example of this would be the DEVICE command which specifies the disk on which the device driver code is held. The device driver code could be stored on any of the disks (e.g. because an expert user of a workstation had decided to move files about and accordingly the files would not be where the installation software originally put them). The system would read the name of the device driver file name and would search the disks to find it and then specify the disk identity in the command to be added to the CONFIG.SYS file. The directory in which the file was held could also be determined in a similar way.

Another refinement of preferred embodiments of the invention in the step of combining includes amalgamating, or merging, compatible configuration change statements to produce a combined configuration change statement within said composite configuration build file. An example of compatible configuration change statements (i.e. capable of amalgamation) are PATH statements. These specify where the operating system will search for a file specified in a command line instruction, e.g. PATH=C:OS2. PATH=C:FRED and PATH=C:JOE may be amalgamated to PATH=COS2;C:FRED;C:JOE. It is more efficient to use amalgamated statements if possible.

Viewed from a second aspect the invention provides a data processing network having control logic for transmitting a software file from a central computer to a workstation via a communication system, reading a configuration build file associated with said transmitted software file, detecting software files already installed upon said workstation, reading one or more configuration build files associated with said detected software files, combining said configuration build file associated with said transmitted software file with said one or more configuration build files associated with said detected software files to produce a composite configuration build file, and reconfiguring said workstation using said composite configuration build file.

An embodiment of the invention will now be described, by way of example only, with reference to the accompanying drawings in which:

DESCRIPTION OF THE PREFERRED EMBODIMENT

Figures 1, 2:
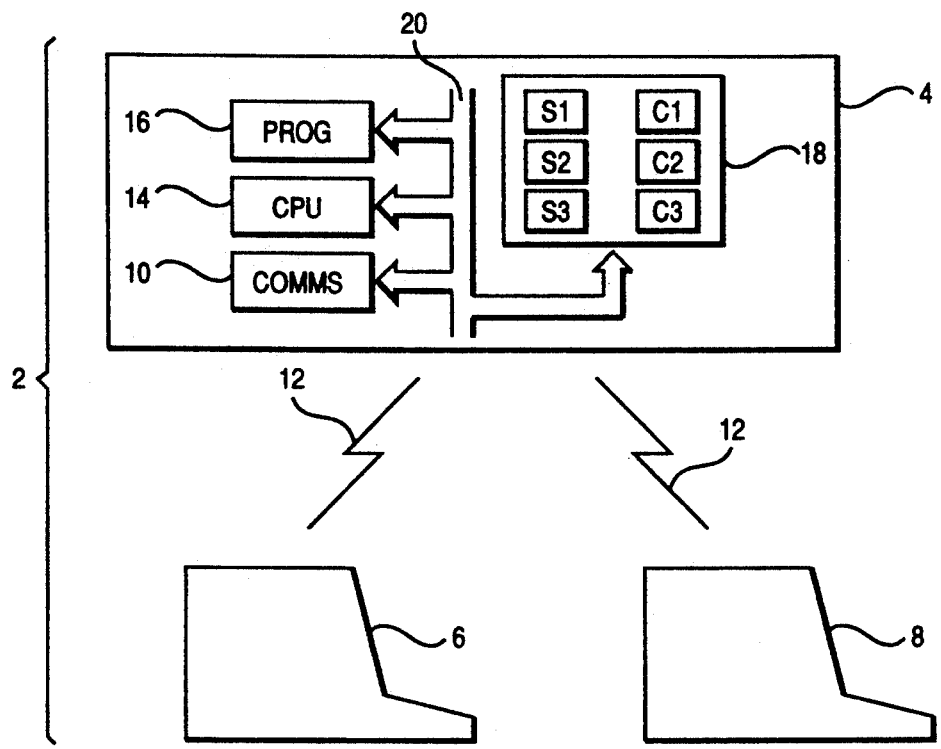
FIG. 1 illustrates the data processing network in accordance with one embodiment of the invention.
FIG. 2 illustrates example configuration build files associated with different items of software and the resulting composite configuration build file.

FIG. 1 illustrates the data processing network 2 comprising a host computer 4 and a plurality of workstations 6, 8. A communication system 10, 12 connects the workstations to the host. The host computer includes a central processor unit 14 acting under the control of a computer program stored in program storage area 16. A software file storage area 18 contains copies of software files $S_1$, $S_2$, $S_3$. Associated with each software file is a configuration build file $C_1$, $C_2$, $C_3$. The software file storage area 18, the program storage area 16, the central processor unit 14, and the communication system 10, 12 are linked together by a bus 20. The central processor unit 14 acting under the control of the program instructions stored in program storage area 16 drives the software installation.

FIG. 2 illustrates a number of software configuration build files for combination and use to reconfigure a workstation. Configuration build file 22 associated with software 1 is the configuration build file of a new piece of software being installed upon the workstation 6, 8. Configuration build files 24 and 26 associated with software 2, and software 3 respectively are the configuration build files of items of software already installed upon the workstation 6, 8. The composite configuration build file 28 is the result of combining the configuration build files 22, 24 and 26 in accordance with this embodiment of the invention.

Each of the configuration build files 22, 24 and 26 which are to be combined contains a IOPL statement, It is not possible to have more than one IOPL statement in a configuration build file since only one setting of this parameter is possible. Configuration build file 22 contains a setting of YES, whereas configuration build files 24 and 26 contain a setting of NO. The configuration changes associated with each of the configuration build files clash. In order to determine what setting of IOPL is to be used the system compares the priority values associated with each of the occurrences of IOPL command within the configuration build files 22, 24 and 26. The setting of YES has a priority value of 100, whereas the setting of NO has priorities of 50 and 40. The setting with the highest priority is adopted and so the statement IOPL=YES is written into the composite configuration build file 28.

Each of the configuration build files 22, 24 and 26 contains a DEVICE statement. There is no problem with a composite configuration build file specifying more than one DEVICE statement since having a plurality of device drivers installed is quite normal. The DEVICE statements in configuration build files 24 and 26 completely specify the location file name, and directory of the device driver code to be installed. The DEVICE statement in configuration build file 22 specifies the file name and directory of the device driver code to be installed, but leaves the drive on which the device driver code is to be found as a variable to be determined during this process of combining the configuration build files 22, 24 and 26. When the statement <DRIVE> is encountered the system searches through the workstation storage to find the drive upon which that driver code is resident. The location thus determined (in this case drive A) then replaces the <DRIVE> statement in the DEVICE command and the resulting DEVICE command is then added to the composite build file 28. Both configuration build files 22, 24 contain BUFFERS statements. The BUFFERS statement specifies the amount of storage within the workstation 6, 8 to be allocated as buffer storage. Whilst only one BUFFER statement within the composite configuration build file 28 is appropriate, the two BUFFERS statements in the configuration build files 22 and 24 do not clash in the same sense as the IOPL statements discussed earlier. Software 2 requires a maximum buffer storage of 20 whereas the new software file Software 1 requires a maximum buffer storage of 60. Accordingly, if the buffer storage is set to 60 all the software files will have enough buffer storage available for them to operate correctly. The system searches for the maximum value of the BUFFERS statement and includes this within the composite configuration build file 28. In this case it is the maximum value of the parameter which is the appropriate one to be specified in the composite configuration build file 28, but in other circumstances it might be the minimum value of a parameter that should be incorporated within the composite configuration build file 28.

All of the configuration build files 22 24 and 26 contain PATH statements. Rather than having multiple PATH statements within the composite configuration build file it is appropriate to amalgamate, or merge, the PATH statements. Accordingly, composite configuration build file 28 contains a single PATH statement produced by detecting each of the arguments of the individual PATH statements within the individual configuration build files 22, 24 and 26 and then specifying these within a single PATH statement with the appropriate syntax in the composite configuration build file 28.

Once the composite configuration build file 28 has been constructed it can then be combined with a user definable configuration build file and a base configuration build file to produce a final result that is used to reconfigure the workstation 6, 8. The base configuration build file would typically contain statements determined by invariable parameters of the related workstation 6, 8, whereas the user definable configuration build file would contain statements entirely at the discretion of the workstation user. which could be set at values preferred by that individual user.

Figure 3:
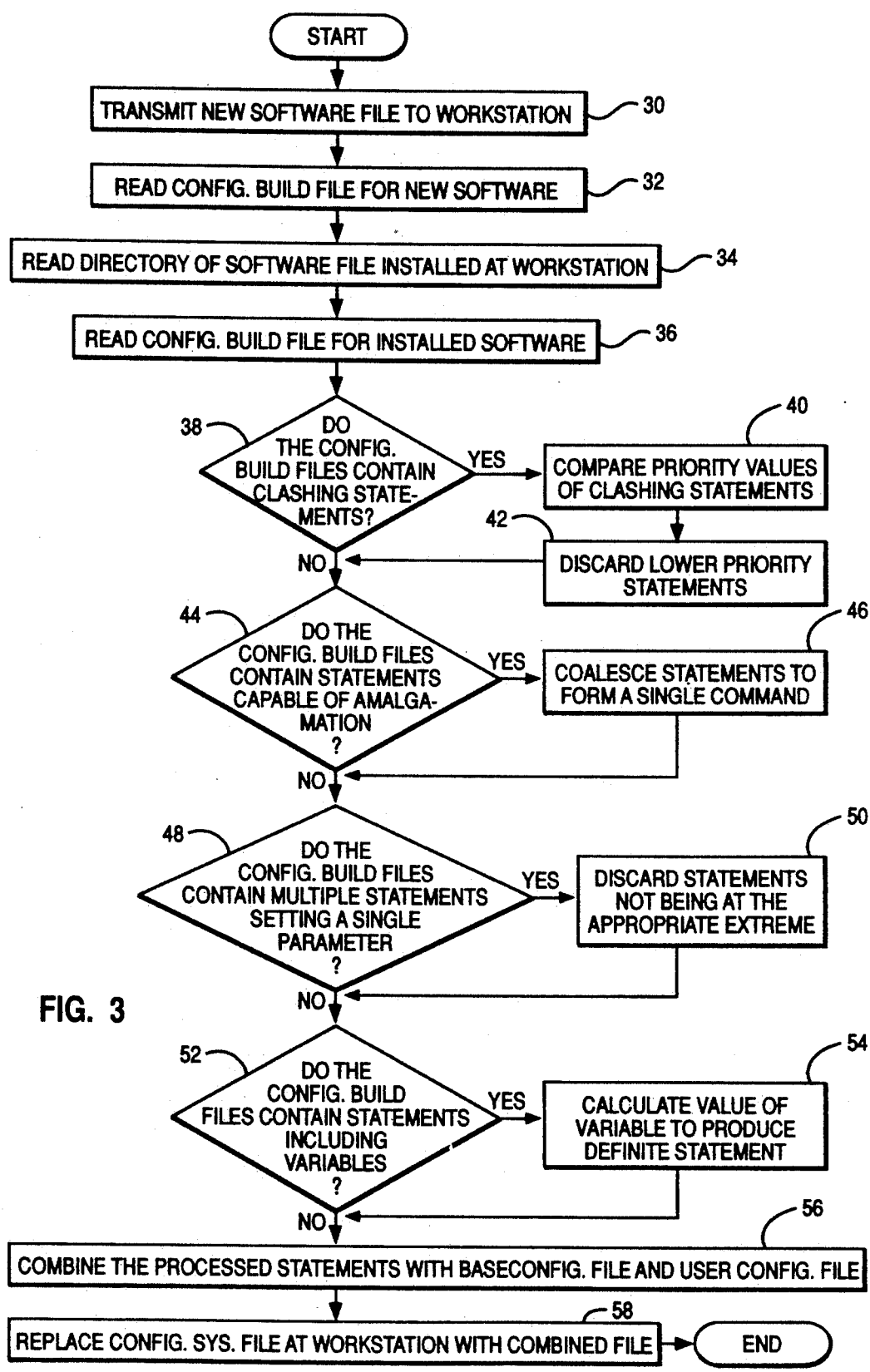
FIG. 3 is a flow diagram illustrating one embodiment of the invention.

FIG. 3 is a flow diagram illustrating the operation of one embodiment of the invention. In steps 30, 32, 34 and 36 the new software file is transmitted to the workstation, the configuration build file associated with that new software file is read, the identity of the software files already installed upon the workstation are determined and the corresponding configuration build files for the installed software files are read. Having carried out the above the system has the information corresponding to the top part of FIG. 2.

At steps 38, 40 and 42 the system searches through the assembled configuration build files to detect statements which would clash. If such statements are detected then the priority values associated with the statements are compared and the statements with lower priority are discarded. In this way statements such as the IOPL statement discussed earlier can be handled.

At steps 44 and 46 the system searches for configuration build file statements capable of amalgamation. If such statements are found then they are coalesced to form a single command using the appropriate syntax. In this way statements such as PATH statements can be handled.

At steps 48 and 50 the system searches for multiple occurrences of statements setting a single parameter. If such statements are found then the appropriate extreme value of the parameter being specified is determined from amongst the statements and it is this value which is then set within the composite build file 28. In this way multiple occurrences of statements such as BUFFERS can be handled.

At steps 52 and 54 the system checks for any configuration build file statements including variables. If such statements are found the system then determines the appropriate value of the variable and replaces the variable with the appropriate value in the statement which is added to composite build file 28. In this way commands such as <DRIVE> within other statements can be handled.

At step 56 the composite configuration build file 28 is combined with a base configuration build file and user configuration build file as discussed previously. At step 58 the CONFIG.SYS file upon the workstation 6, 8 is replaced by the CONFIG.SYS file that has been determined in the preceding steps. The process then terminates.

It will be appreciated that whilst the invention has been described in terms of an embodiment using a programmed general purpose computer, it would be possible (although in practice difficult and expensive) to embody the invention within special purpose hardware. It is also possible to write the software necessary to control the general purpose computer embodying the invention in any appropriate computer language.

We claim:

1. In a data processing system comprising a central computer, and at least one workstation connected to the central computer through a communication system, a method of installing software files in said workstation comprising the steps of:

transmitting a software file from said central computer to said workstation via said communication system;

reading, by one or both of said central computer and said workstation, a configuration build file located in said central computer, said configuration build file containing one or more configuration parameters associated with said software file, said configuration parameters controlling configuration of said workstation;

detecting, by said one or both of said central computer and said workstation, software files installed in said workstation;

reading from said workstation, by said one or both of said central computer and said workstation, at least one configuration build file containing configuration parameters associated with said detected software files;

combining, by said one or both of said central computer and said workstation, said configuration parameters contained in said configuration build file associated with said transmitted software file with said configuration parameters contained in said at least one configuration build file associated with said detected software files to generate a composite configuration build file; and reconfiguring said workstation using at least said composite configuration build file to reflect the configuration parameters required by installation of said transmitted software file.

2. A method as claimed in claim 1, further comprising the step of determining values of variables specifying configuration parameters within said configuration build files.

3. A method as claimed in claim 1, wherein said step of combining includes merging compatible configuration parameter statements to produce a combined configuration parameter statement within said composite configuration build file.

4. A method as claimed in claim 1, wherein said one or more configuration parameters required by said software file are associated with a priority value required by said software file, and said step of combining further comprises comparing, by said one or both of said central computer and said workstation, priority values between any conflicting configuration parameters and including a high priority configuration parameter in said composite configuration build file resulting from said priority values comparison.

5. A method as claimed in claim 4, further comprising the step of determining values of variables specifying configuration changes within said configuration build files.

6. A method as claimed in claim 4, wherein said step of combining includes merging compatible configuration parameter statement within said composite configuration build file.

7. A method as claimed in claim 2, wherein said step of combining includes merging compatible configuration parameter statements to produce a combined configuration parameter statement within said composite configuration build file.

8. A method as claimed in claim 5, wherein said step of combining includes merging compatible configuration parameter statements to produce a combined configuration parameter statement within said composite configuration build file.

9. In a data processing system comprising a central computer, and at least one workstation connected to the central computer through a communication system, a system for installing software files in said workstation comprising:
  transmitting means for transmitting a software file from said central computer to said workstation via said communication system;
  first reading means, coupled to said transmitting means, for reading a configuration build file located in said central computer, said configuration build file containing one or more configuration parameters associated with said software file, said configuration parameters controlling configuration of said workstation;
  detecting means, coupled to said transmitting means, for detecting software files installed in said workstation;
  second reading means, coupled to said transmitting means, for reading from said workstation at least one configuration build file containing configuration parameters associated with said detected software files;
  combining means, coupled to said transmitting means, for combining said configuration parameters contained in said configuration build file associated with said transmitted software file with said configuration parameters contained in said at least one configuration build file associated with said detected software files to generate a composite configuration build file; and
  reconfiguring means, coupled to said transmitting means, for reconfiguring said workstation using at least said composite configuration build file to reflect the configuration parameters required by installation of said transmitted software file.

10. A system as claimed in claim 9, wherein said one or more configuration changes required by said software file are associated with a priority value required by said software file, and said combining means further comprises comparing means for comparing priority values between any conflicting configuration changes and including a high priority configuration change in said composite configuration build file resulting from said priority values comparison.

11. A system as claimed in claim 9, further comprising determining means for determining values of variables specifying configuration changes within said configuration build files.

12. A system as claimed in claim 10, further comprising determining means for determining values of variables specifying configuration changes within said configuration build files.

13. A system as claimed in claim 9, wherein said combining means further comprises merging means for merging compatible configuration parameter change statements to produce a combined configuration parameter statement within said composite configuration build file.

14. A system as claimed in claim 10, wherein said combining means further comprises merging means for merging compatible configuration parameter statements to produce a combined configuration parameter statement within said composite configuration build file.

15. A system as claimed in claim 11, wherein said combining means further comprises merging means for merging compatible configuration parameter statements to produce a combined configuration parameter statement within said composite configuration build file.

16. A system as claimed in claim 12, wherein said combining means further comprises merging means for merging compatible configuration parameter statements to produce a combined configuration parameter statement within said composite configuration build file.

17. In a data processing system comprising a central computer, and at least one workstation connected to the central computer through a communication system, a method of installing software files in said workstation comprising the steps
  transmitting a software file from said central computer to said workstation via said communication system, said software file having first configuration build information containing one or more configuration parameters associated with said transmitted software file;
  detecting, by one or both of said central computer and said workstation, software files installed in said workstation;
  reading from said workstation, by said one or both of said central computer and said workstation, second configuration build information containing one or more configuration parameters associated with said detected software files; and
  combining, by said one of both of said central computer and said workstation, said configuration parameters contained in said first configuration build information associated with said transmitted software file with said configuration parameters contained in said second configuration build information associated with said detected software files to generate a composite configuration build file; and
  reconfiguring said workstation using at least said composite configuration build file to reflect the configuration required by said transmitted software file.

18. A method as claimed in claim 17, wherein said one or more configuration parameters required by said software file are associated with a priority value required by said software file, and said step of combining further comprises comparing, by said one or both of said central computer and said workstation, priority values between any conflicting configuration parameters and including a high priority configuration parameter in said composite configuration build file resulting from said priority values comparison.

19. A method as claimed in claim 17, further comprising the step of determining values of variables specifying configuration parameters within said first and second configuration build information.

20. A method as claimed in claim 18, further comprising the step of determining values of variables specifying configuration parameters within said first and second configuration build information.

21. A method as claimed in claim 17, wherein said step of combining includes merging compatible configuration parameter statements to produce a combined configuration parameter statement within said composite configuration build file.

22. A method as claimed in claim 18, wherein said step of combining includes merging compatible configuration parameter statements to produce a combined configuration parameter statement within said composite configuration build file.

23. A method as claimed in claim 19, wherein said step of combining includes merging compatible configuring parameter statements to produce a combined configuration parameter statement within said composite configuration build file.

24. A method as claimed in claim 20, wherein said step of combining includes merging compatible configuration parameter statements to produce a combined configuration parameter statement within said composite configuration build file.

25. In a data processing system comprising a central computer, and at least one workstation connected to the central computer through a communication system, a system for installing software files in said workstation comprising:
   transmitting means for transmitting a software file from said central computer to said workstation via said communication system, said software file having first configuration build information containing one or more configuration parameters associated with said transmitted software file;
   detecting means, coupled to said transmitting means, for detecting software files installed upon said workstation;
   reading means, coupled to said transmitting means, for reading from said workstation, by said one or both of said central computer and said workstation, second configuration build information containing one or more configuration parameters associated with said detected software files;
   combining means, coupled to said transmitting means, for combining said configuration parameters contained in said first configuration build information associated with said transmitted software file with said configuration parameters contained in said second configuration build information associated with said detected software files to produce a composite configuration build file; and
   reconfiguring means, coupled to said transmitting means, for reconfiguring said workstation using at least said composite configuration build file to reflect the configuration required by said transmitted software file.

26. In a data processing system comprising a central computer and at least one workstation connected to the central computer through a communication system, said workstation having workstation software files and first configuration build information containing configuration parameters associated with said workstation software files, a method of installing software files comprising the steps of:
   transmitting, by one or both of said central computer and said workstation, a software file from said central computer to said workstation via said communication system, said transmitted software file having second configuration build information containing configuration parameters associated with said workstation software files;
   combining, by one or both of said central computer and said workstation, said parameters contained in said first configuration build information with said parameters contained in said second configuration build information to produce a composite configuration build file; and
   reconfiguring, by said one of said central computer and said workstation, said workstation using at least said composite configuration build file to reflect the configuration required by said transmitted software file.

27. In a data processing system comprising a central computer, and at least one workstation connected to the central computer through a communication system, said workstation having workstation software files and first configuration build information containing configuration parameters associated with said workstation software files, a system for installing software files within said workstation comprising:
   transmitting means for transmitting, by one or both of said central computer and said workstation, a software file from said central computer to said workstation via said communication system, said transmitted software file having second configuration build information containing configuration parameters associated with said workstation software files;
   combining means for combining, by said one of said central computer and said workstation, said parameters contained in said first configuration build information with said parameters contained in said second configuration build information to produce a composite configuration build file; and
   reconfiguring means for reconfiguring, by said one of said central computer and said workstation, said workstation using at least said composite configuration building file to reflect the configuration required by said transmitted software file.

* * * * *